United States Patent
Minnich, Jr. et al.

(10) Patent No.: US 8,150,022 B2
(45) Date of Patent: Apr. 3, 2012

(54) CALL CENTER QUEUE MANAGEMENT

(75) Inventors: Thomas M. Minnich, Jr., Round Rock, TX (US); Ted Alan Wrenn, Jr., Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 960 days.

(21) Appl. No.: 11/959,608

(22) Filed: Dec. 19, 2007

(65) Prior Publication Data

US 2009/0161849 A1  Jun. 25, 2009

(51) Int. Cl.
*H04M 5/00* (2006.01)
(52) U.S. Cl. ......... 379/265.06; 379/265.07; 379/265.08; 379/265.1; 379/265.11; 379/265.12
(58) Field of Classification Search ............. 379/265.05, 379/265.06, 266.01–266.03
See application file for complete search history.

(56) References Cited

U.S. PATENT DOCUMENTS

| | | | |
|---|---|---|---|
| 5,991,395 A | 11/1999 | Miloslavsky | |
| 6,263,065 B1* | 7/2001 | Durinovic-Johri et al. | 379/266.03 |
| 7,228,281 B1 | 6/2007 | Ney et al. | |
| 2005/0080637 A1* | 4/2005 | Gruia et al. | 705/1 |
| 2005/0185778 A1* | 8/2005 | Danzl et al. | 379/112.01 |
| 2006/0045256 A1* | 3/2006 | Erdman | 379/266.07 |
| 2006/0062376 A1* | 3/2006 | Pickford | 379/265.12 |
| 2006/0147025 A1* | 7/2006 | Dezonno et al. | 379/265.02 |
| 2006/0245551 A1 | 11/2006 | Tasker et al. | |
| 2007/0206768 A1* | 9/2007 | Bourne et al. | 379/265.01 |
| 2007/0230682 A1* | 10/2007 | Meghan et al. | 379/265.06 |
| 2008/0212760 A1* | 9/2008 | Beshears et al. | 379/210.01 |

* cited by examiner

*Primary Examiner* — Joseph J Nguyen
(74) *Attorney, Agent, or Firm* — Haynes and Boone, LLP

(57) ABSTRACT

Call center queue management includes a method for calculating an average capability for each of a plurality of agents obtaining all completion data for each agent. The call completion data is used to calculate a historical average for each agent. The historical average is used to calculate an average capability for each agent.

8 Claims, 12 Drawing Sheets

| Dashboard | Risk Management | Schedule Flex Rewards | Schedule Flex Preference | Schedule Adherence & Compliance | Historical Reporting | Documentation |

Hello Tom:

Set Schedule Flex Preference

Please select from the drop-down fields below your schedule flex preferences and click submit. Schedule flex preferences will be updated in the system immediately.

Are you willing to flex your assigned break schedule? — Yes

Are you willing to flex your assigned lunch schedule? — Yes

How much advance notice do you need to make an effective decision about flexing your assigned work schedule on a given workday? — 15 minutes How much time (earlier and/or later) are you willing to shift from your scheduled break times to support flex scheduling? — 30 minutes How much time (earlier and/or later) are you willing to shift from your scheduled lunch time to support flex scheduling? — 30 minutes How many times each day are you willing to receive requests to flex your assigned work schedule? — 2

What days of the week, if any, would need to be excluded from requests to flex your assigned work schedule? — Su ☐ Mo ☐ Tu ☐ We ☐ Th ☐ Fr ☐ Sa ☐

Submit

*Fig. 1e*

| Dashboard | Risk Management | Schedule Flex Rewards | Schedule Flex Preference | Schedule Adherence & Compliance | Historical Reporting | Documentation |

Hello Tom:
Schedule Flex Reporting

Agent Type/Manager
  Month ˅    10/27/07 - 11/12/07 ˅

Sites
  ☐ Edmonton, Canada  ☐ Nashville, TN  ☐ Oklahoma City, OK  ☐ Ottawa, Canada  ☐ Panama City, Panama
  ☐ Denton, TX        ☐ Round Rock, TX ☐ Toronto, Canada    ☒ Twin Falls, ID Area Managers
  ˅ All
  Amarullah, Rae    Grey, Cindy L.    Shield, Tim
  Murphy, Susan P.

| Name | Total Flex Opportunities | Total Accepted Flex Opportunities | Total Declined Flex Opportunities | Flex Percentage |
|---|---|---|---|---|
| Name 2 | 0 | 2 | 0.00% |
| Name 1 | 0 | 1 | 0.00% |
| Name 4 | 0 | 4 | 0.00% |
| Name 5 | 0 | 5 | 0.00% |
| Name 3 | 0 | 3 | 0.00% |
| Name 5 | 0 | 5 | 0.00% |
| Name 5 | 0 | 5 | 0.00% |
| Name 4 | 0 | 4 | 0.00% |
| Name 4 | 0 | 4 | 0.00% |
| Name 1 | 0 | 1 | 0.00% |
| Name 3 | 0 | 3 | 0.00% |

⊙ CONTINUE

✋ Feedback | ✉ E-Mail Page | 🖨 Printable Version

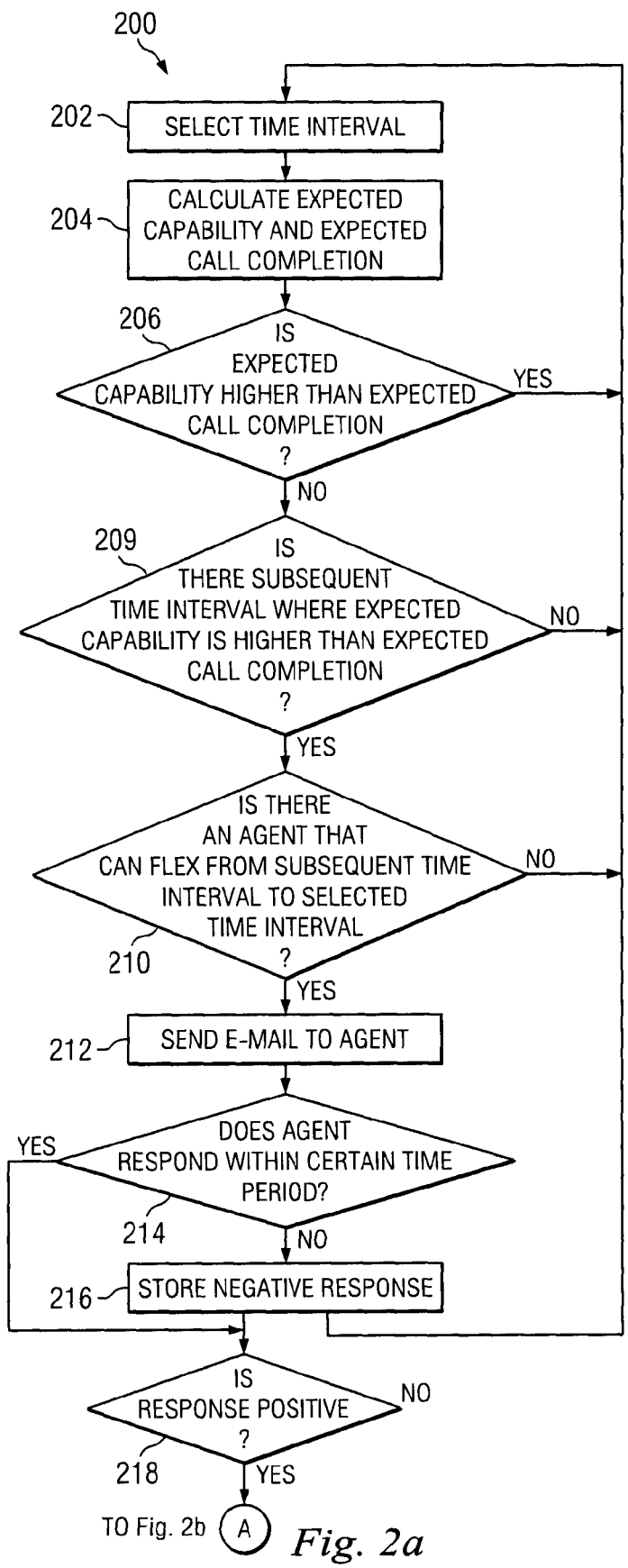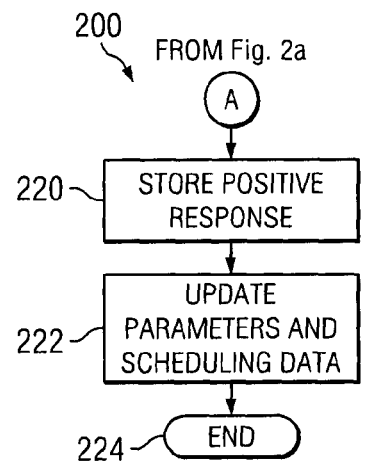
Fig. 2a
Fig. 2b

D≋LL™

| Dashboard | Risk Management | Schedule Flex Rewards | Schedule Flex Preference | Schedule Adherence & Compliance | Historical Reporting | Documentation |

Feedback | E-Mail Page | Printable Version

Hello Tom:
Risk Management

Step 1. Select Response

Reason/Issue

Inclement Weather ▾

Time Range Start
3:00 pm ▾

Time Range Stop
3:30 pm ▾

-- Select a reason --
Dellserv / Network Issue
Inclement Weather
Switch Issue

St ___ / Telecom / Site Impact

Source

Impact Modifier
%

Destination

⊞ A01G
⊞ PAIG
⊞ 05PWKS
⊞ PC1G
⊞ PS2G
⊞ RR8G
⊞ S38G

⊞ A01G
⊞ PAIG
⊞ PC1G
⊞ PS2G
⊞ RR8G
⊞ S38G

Submit

Step 3. Enter Risk Comments

This is a demo of system functionality. Please Disregard entry

| Risk ID | Reason | Submit Date | Start Date | End Date | Actions |
|---------|--------|-------------|------------|----------|---------|
| 22 | Switch Issue | 8/6/2007 3:27:58 PM | 8/6/2007 12:00:00 PM | 8/6/2007 11:00:00 PM | Copy / Delete |

CALL CENTER QUEUE MANAGEMENT

CROSS REFERENCE TO RELATED APPLICATIONS

The present application is related to U.S. Utility application Ser. No. 11/959,690, filed on Dec. 19, 2007, the disclosure which is incorporated herein by reference.

BACKGROUND

The present disclosure relates generally to information handling systems, and more particularly to call center queue management.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Call center queue managers have historically assumed one-to-one comparisons of agent productivity to calculate site production levels and to determine if contractual call center obligations may be met. A manager conventionally assumes that if a first agent is unavailable, a second agent can substitute in place of the first agent without having an impact on customer service capabilities.

However, each agent in a call center can have unique capabilities, and substituting a second agent in place of a first agent may have a negative impact on customer service capabilities. Additionally, this may cause difficulties in creating staffing schedules, and may also cause inefficiencies due to inadvertent overstaffing and understaffing at various times.

Accordingly, it would be desirable to provide an improved call center queue management that avoids the problems set forth above.

SUMMARY

According to one embodiment, call center queue management is achieved by a method for calculating an average capability for each of a plurality of agents. The method includes obtaining call completion data for each agent. The call completion data is used to calculate a historical average for each agent. The historical average is used to calculate an average capability for each agent.

BRIEF DESCRIPTION OF THE DRAWINGS

FIG. 1e illustrates an embodiment of a CCM flex preference web page used in the system of FIG. 1b.

FIG. 1i illustrates an embodiment of a CCM flex reporting web page used in the system of FIG. 1b.

FIGS. 2a and 2b illustrate an embodiment of a first method to manage a call center using the system of FIG. 1b.

FIG. 3e illustrates an embodiment of a CCM risk management web page used in the method of FIGS. 3a and 3b.

DETAILED DESCRIPTION

Figure 1A:
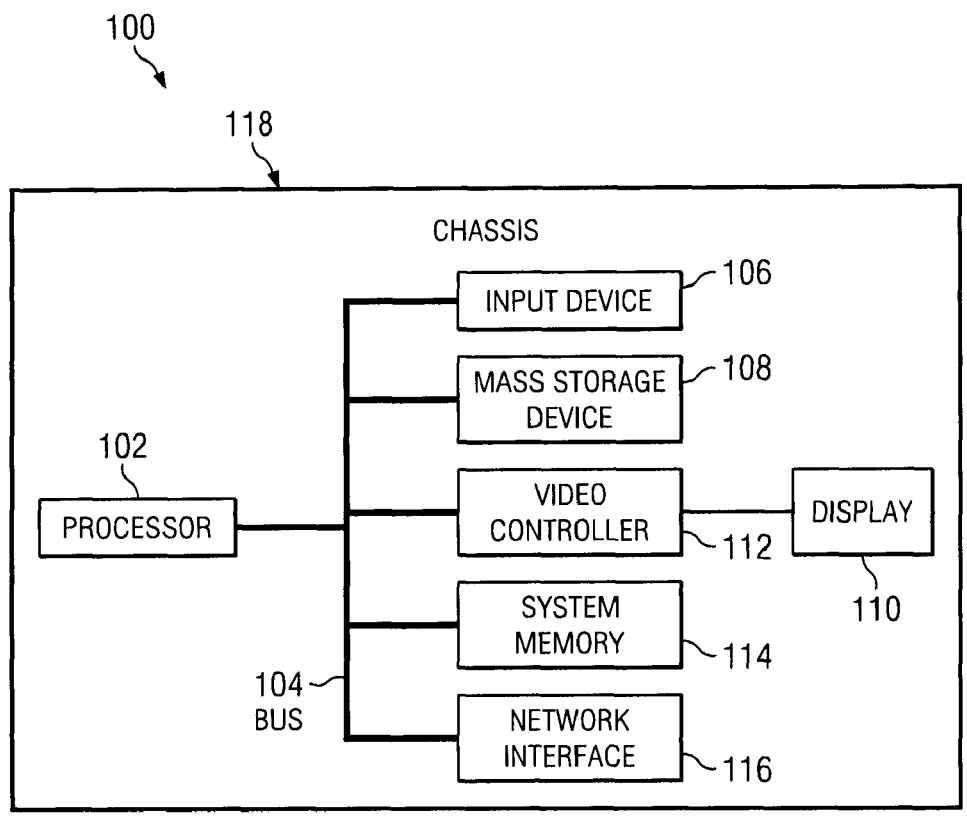
FIG. 1a illustrates an embodiment of an information handling system (IHS).

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

In one embodiment, IHS 100, FIG. 1, includes a processor 102, which is connected to a bus 104. Bus 104 serves as a connection between processor 102 and other components of computer system 100. An input device 106 is coupled to processor 102 to provide input to processor 102. Examples of input devices include keyboards, touchscreens, and pointing devices such as mouses, trackballs and trackpads. Programs and data are stored on a mass storage device 108, which is coupled to processor 102. Mass storage devices include such devices as hard disks, optical disks, magneto-optical drives, floppy drives and the like. IHS 100 further includes a display 110, which is coupled to processor 102 by a video controller 112. A system memory 114 is coupled to processor 102 to provide the processor 102 with fast storage to facilitate execution of computer programs by processor 102. A network interface 116 is coupled to the processor 102 to allow processor 102 to connect to a network. In an embodiment, a chassis 118 houses some or all of the components of IHS 100. It should be understood that other buses and intermediate circuits can be deployed between the components described above and processor 102 to facilitate interconnection between the components and the processor 102.

Figure 1B:
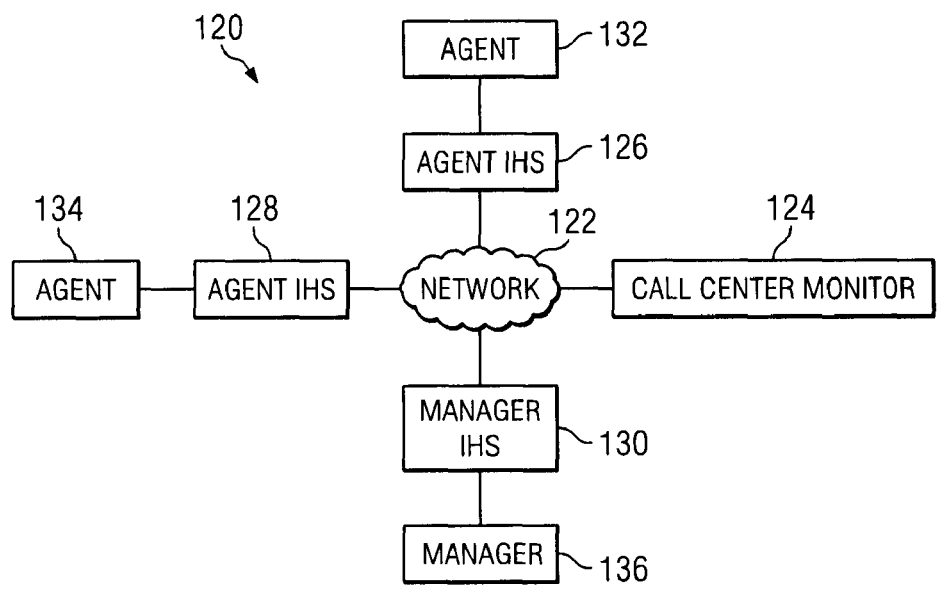
FIG. 1b illustrates an embodiment of a system for managing a call center.

Referring now to FIG. 1b, an embodiment of a system 120 for managing a call center is illustrated. The system 120 includes a network 122 (e.g., a Transport Control Protocol/Internet Protocol (TCP/IP) network), which is coupled to a call center monitor (CCM) 124, an agent IHS 126, an agent IHS 128, and a manager IHS 130. Each of the CCM 124, the agent IHS 126, the agent IHS 128, and the manager IHS 130 may include an IHS similar to the IHS 100, and accordingly each may communicate with each other over the network 122. The agent IHS 126, the agent IHS 128, and the manager IHS 130 are coupled to and used by an agent 132, an agent 134, and a manager 136, respectively, who may be employees of a call center and/or a provider. The agent 132 and the agent 134 may each be responsible for communicating with customers of the provider through telephone and/or e-mail. The CCM 124 and/or the manager 136 may be responsible for monitoring and/or administrating operations of the call center. The CCM 124 may include a variety of software, such as a web site hosted on a web server, which may be accessible by the agent 132, the agent 134, and the manager 136 through the agent IHS 126, the agent IHS 128, and the manager IHS 130, respectively.

For clarity, only one network, one CCM, one manager IHS, one manager, two agent IHSs, and two agents are illustrated in FIG. 1b. However, it should be understood that any plurality of networks, CCMs, manager IHSs, managers, agent IHSs, agents, and call centers may be used in accordance with the present invention. Furthermore, in the discussion below, the agent 132 is used as a representative one of the agents 132 and 134.

The call center can have one or more service level goals for one or more customer segments. For example, one customer segment might include business customers for whom the service level goals may include answering 90% of telephone calls from the customers within two minutes. A second customer segment might include, for example, residential customers for whom the service level goals may include answering 90% of telephone calls within five minutes. In an embodiment, the call center may support only one customer segment. In another embodiment, the call center may support a plurality of customer segments.

The agent 132 may be in an inbound phone state if the agent 132 is communicating on an inbound phone call with a customer. The agent 132 may be in an available phone state if the agent 132 is available to communicate on an inbound phone call with a customer. If the agent 132 is in an inbound phone state or an available phone state, the agent 132 may be considered to be in an inbound phone queue state. The agent 132 may be in an auxiliary phone state if the agent 132 is not in an inbound phone queue state. An auxiliary phone state may include a variety of states such as, for example, an outbound phone state, a break, a lunch break, an absence, or a meeting. In addition, an auxiliary phone state or an inbound phone queue state may be planned or unplanned. For example, if the agent 132 is scheduled to be in an inbound phone queue state during a specified time interval, but the agent 132 is instead in an auxiliary phone state, such as a meeting, during the specified time interval, the agent 132 may be considered to be in an unplanned auxiliary phone state. Alternatively, for example, if the agent 132 is scheduled to be in an outbound phone state during a specified interval, and the agent 132 is in an outbound phone state during the specified interval, the agent 132 may be considered to be in a planned auxiliary phone state.

The CCM 124 may include additional software for a variety of tasks relating to the call center, such as scheduling, monitoring, analyzing, and controlling operations of the call center and the agent 132. Some of these tasks are described in further detail in the various embodiments below. Information about all inbound and outbound phone calls (e.g., participants, start times, stop times, durations) may be tracked and stored by the CCM 124. The CCM 124 may further include a variety of information about the agent 132 such as one or more planned states, actual states, and/or capabilities of the agent 132. A planned state may be a state (e.g., an inbound phone queue state or an auxiliary phone state, described above) that the agent 132 has been scheduled to be in during a specified time interval. An actual state may be a state that the agent 132 is actually in during a specified time interval. An actual state may be entered by the agent 132 (e.g., using a web site provided by the CCM 124) to reflect new activities being performed by the agent 132. For example, immediately before going to lunch, the agent 132 may enter a lunch break state into the web site of the CCM 124, and immediately after returning from lunch, the agent 132 may enter an inbound phone queue state into the web site of the CCM 124. Upon the agent 132 entering an actual inbound phone queue state, the CCM 124 may place the agent 132 into an inbound phone queue such that inbound customer phone calls are routed to the agent 132.

The CCM 124 may use information it has stored about the agent 132 over time to calculate an average capability of the agent 132. The average capability of the agent 132 may be defined as a historical average of the number of inbound calls the agent 132 is able to complete in a given interval of time, assuming that the agent 132 is working at full capacity. Working at full capacity may include that the inbound phone queue is never empty (i.e., immediately after a call has been completed, another call is transferred to the agent 132). For example, if the agent 132 has completed 1000 calls in 110 hours, wherein the agent was not in a phone call for 10 of the 110 hours due to an empty inbound phone queue, the average capability of the agent 132 may be calculated as 10 calls per hour (i.e., 1000 divided by 100), or alternatively five calls per half-hour.

The CCM 124 may additionally calculate several other parameters relating to time intervals. Prior to and/or during each interval, the CCM 124 may calculate a variety of parameters for the interval, including a planned capability, an expected capability, and an expected call completion. A planned capability for an interval describes the number of calls the call center is projected to be able to complete in the interval, given that all agents comply with their schedules. Planned capability may be calculated to include the sum of the average capabilities, described above, of all agents (e.g., the agents 132 and 134) for the interval. For example, for an interval from 8:00 to 8:30, if the agent 132 has an average capability of 7.5 calls per half-hour, the agent 134 has an average capability of 2.5 calls per half-hour, and both of the agents 132 and 134 are scheduled to be in an inbound phone queue state for the interval, the planned capability for the interval may be calculated to be 10 calls (i.e., 7.5 calls per half-hour plus 2.5 calls per half-hour). An expected capability for an interval describes the number of calls the call center is projected to complete in the interval, given that one or more of the agents may not comply with their schedule, and thus may be in an unplanned auxiliary phone state, described above. Expected capability may be calculated to include the planned capability minus an expected variance. The expected variance may include a historical average of previous unplanned auxiliary phone states in similar intervals. For example, for the interval from 8:00 to 8:30, if the planned capability is 10 calls, but if historical data shows that the call center and/or agents typically lose approximately 10% of their planned capability due to unplanned auxiliary phone states, the expected capability for the interval may be calculated to be nine calls (i.e., 10 calls per half-hour*(100%−10%)). In an embodiment, calculation of the expected variance may further include an actual variance, which may include data relating to the selected interval, such as actual unplanned phone states in the selected interval. An expected call completion for an interval describes the number of calls that the call center is projected to receive and/or complete in the interval. The expected call completion may be calculated using a historical average of previous measured inbound call rates.

After or during an interval, the CCM 124 may calculate additional parameters relating to the interval, including an actual capability and a utilized capability. An actual capability for an interval describes the sum of the capabilities of the agents during the interval, wherein the capabilities are adjusted for gaps in phone usage due to an empty inbound phone queue because of a lull in incoming phone calls. For example, for an interval from 8:00 to 8:30, if the agent 132 completed three calls in 15 minutes, and the agent 134 completed one call in 15 minutes, but the agents 132 and 134 were not on phone calls for the other 15 minutes due to an empty inbound phone queue, the actual capability for the interval may be calculated to be eight calls (i.e., (three calls plus one call) divided by (15 minutes divided by 30 minutes)). A utilized capability for an interval describes the sum of the capabilities of the agents, without adjusting for gaps in phone usage. For example, in the previous example the utilized capability for the interval may be calculated to be four calls (i.e., three calls plus one call).

It should be understood that the above calculations are for illustration purposes only. Accordingly, a variety of variations on the above calculations and parameters may be used in accordance with various embodiments of the present invention. Furthermore, in the embodiments discussed herein, a default time interval of 30 minutes is described. However, one of skill in the art will recognize that a variety of other time intervals may be used in accordance with various embodiments of the present invention.

Figure 1C:
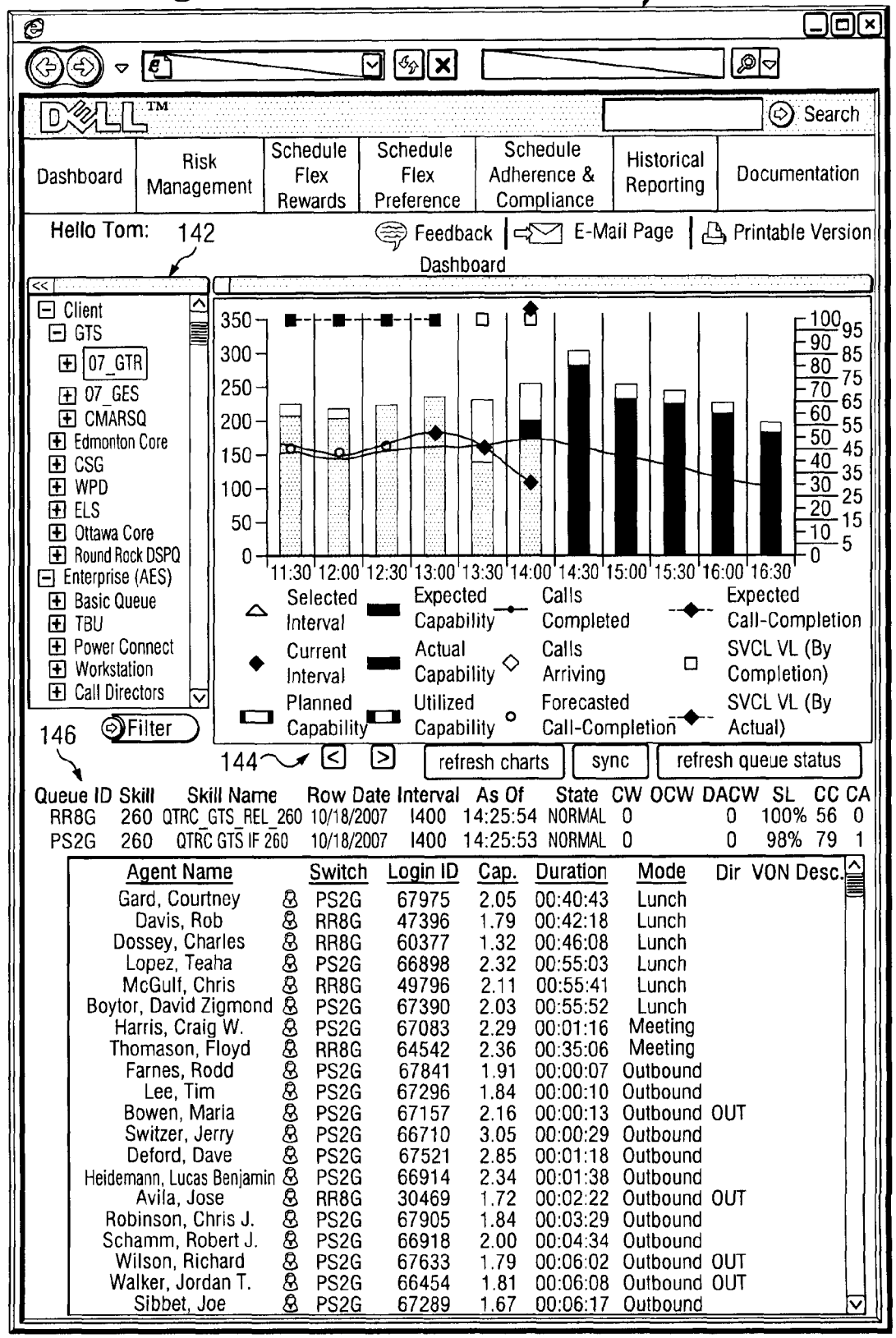
FIG. 1c illustrates an embodiment of a first view of a Call Center Monitor (CCM) web page used in the system of FIG. 1b.

Referring now to FIG. 1c, an embodiment of a CCM dashboard web page 140 is illustrated. The CCM dashboard web page 140 may be provided to the manager 136 by the web server of the CCM 124, and may be used by the manager 136 to perform analysis and/or administration of the operations of the call center. The CCM dashboard web page 140 may include a business filter section 142, a queue tracker section 144, and a queue summary/capability section 146. The business filter section 142 allows the manager 136 to filter the contents of the web page by various criteria such as by business segment, call center, location, customer segment, and/or product type. The queue tracker section 144 displays a bar and line graph illustrating planned capabilities, expected capabilities, actual capabilities, utilized capabilities, expected call completions, and a variety of other data for several consecutive intervals. The queue summary/capability section 146 displays a variety of information about the inbound phone queues and the agents (e.g., agent 132 and agent 134).

Figure 1D:
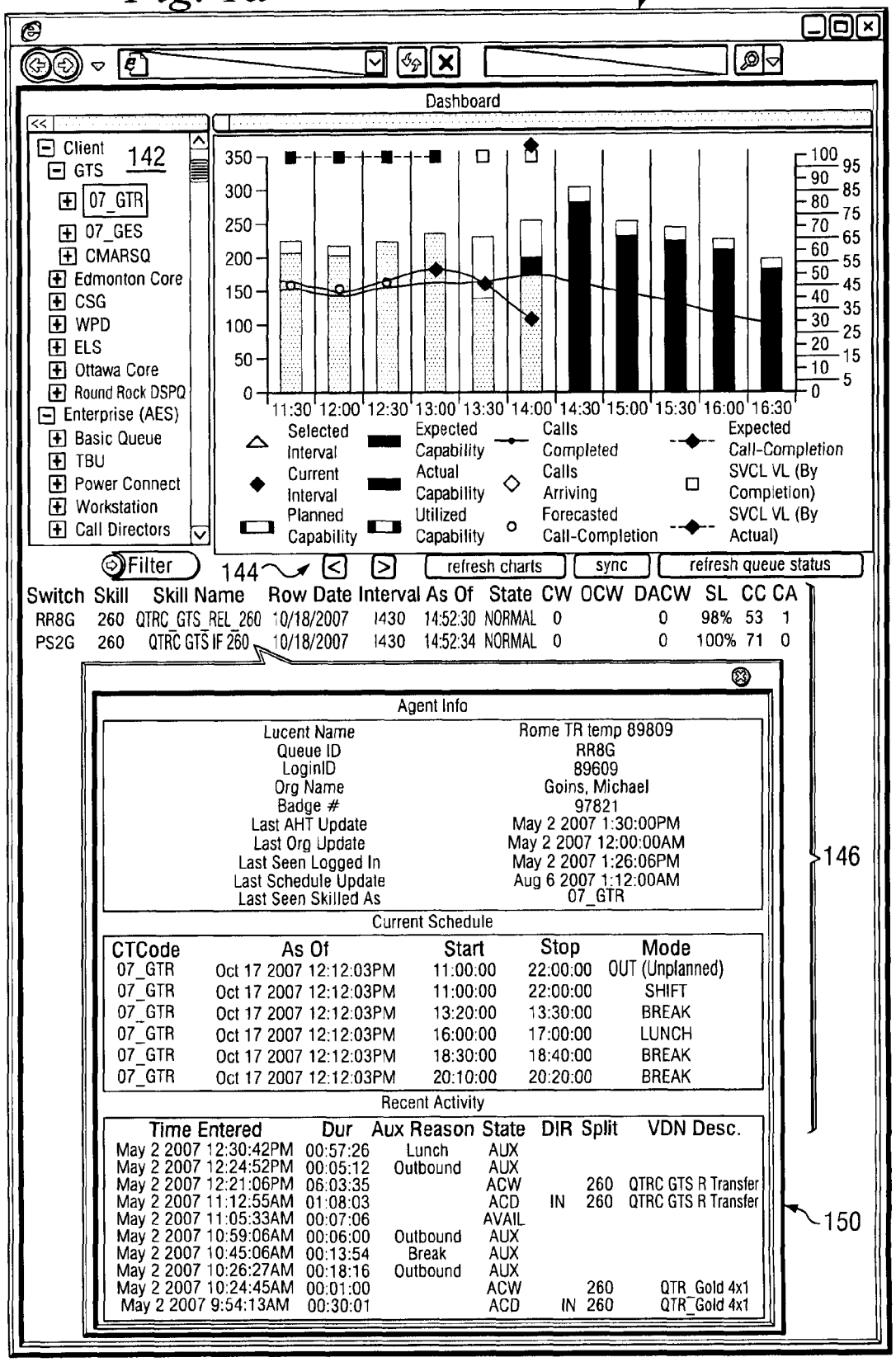
FIG. 1d illustrates an embodiment of a second view of a CCM web page used in the system of FIG. 1b.

Referring now to FIG. 1d, in an embodiment, the manager 136 may use an input device of the manager IHS 130 to click on an agent name in the queue summary/capability section 146 of the CMM dashboard web page in order to see an agent information pop-up window 150. The agent information pop-up window 150 may include a variety of information about an agent (e.g., agent 132) including a name, an agent identification number, schedule information, state information, and a queue identification number.

In an embodiment, the agent 132 may be encouraged to flex (i.e., shift) certain scheduled time intervals in order to improve expected capability for one or more intervals. For example, if the manager 136 desires additional expected capability from 12:00 PM to 1:00 PM, and the agent 132 has a scheduled lunch break from 12:00 PM to 1:00 PM, the manager 136 and/or the CCM 124 may request that the agent 132 instead be in an inbound phone queue state from 12:00 to 1:00 PM, and have the lunch break from 1:00 PM to 2:00 PM.

Referring now to FIG. 1e, an embodiment of a CCM flex preference web page 160 is illustrated. The CCM flex preference web page 160 may be provided to the agent 132 by the web server of the CCM 124. In an embodiment, the agent 132 may use the CCM flex preference web page 160 to specify flex preferences for future flex requests sent to the agent 132. The flex preferences may include whether the agent 132 would be willing to flex breaks or lunch breaks, a maximum advance notice for flex requests, a maximum amount of time for flex requests, a maximum number of daily flex requests, and which days of the week to receive flex requests.

Figure 1F:
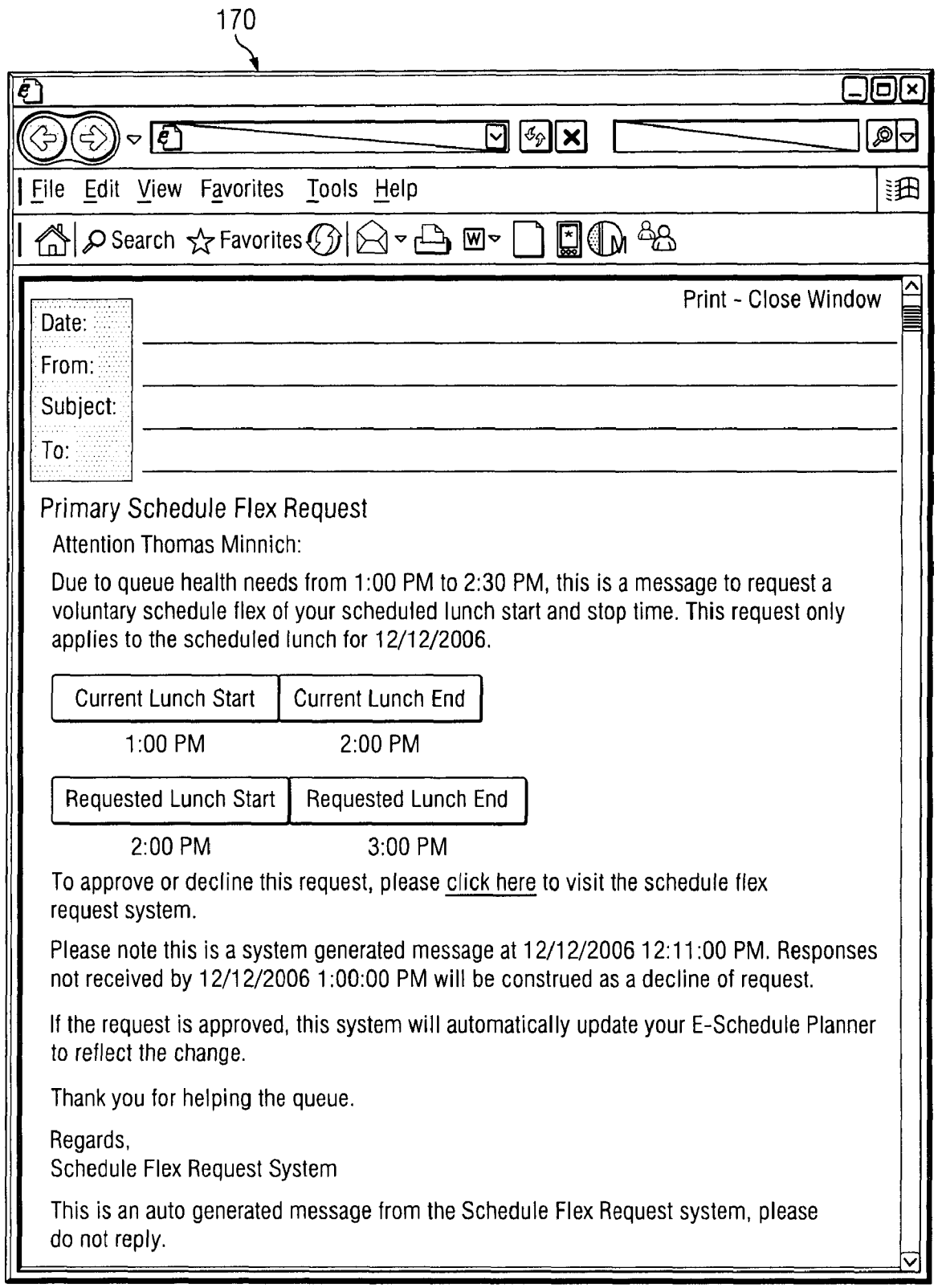
FIG. 1f illustrates an embodiment of a flex request e-mail used in the system of FIG. 1b.

Referring now to FIG. 1f, an embodiment of a flex request e-mail 170 is illustrated. The flex request e-mail 170 may be sent to the agent 132 by the CCM 124 in order to request that the agent 132 flex a lunch break. In an embodiment, the agent 132 may receive rewards for accepting a certain number of flex requests.

Figure 1G:
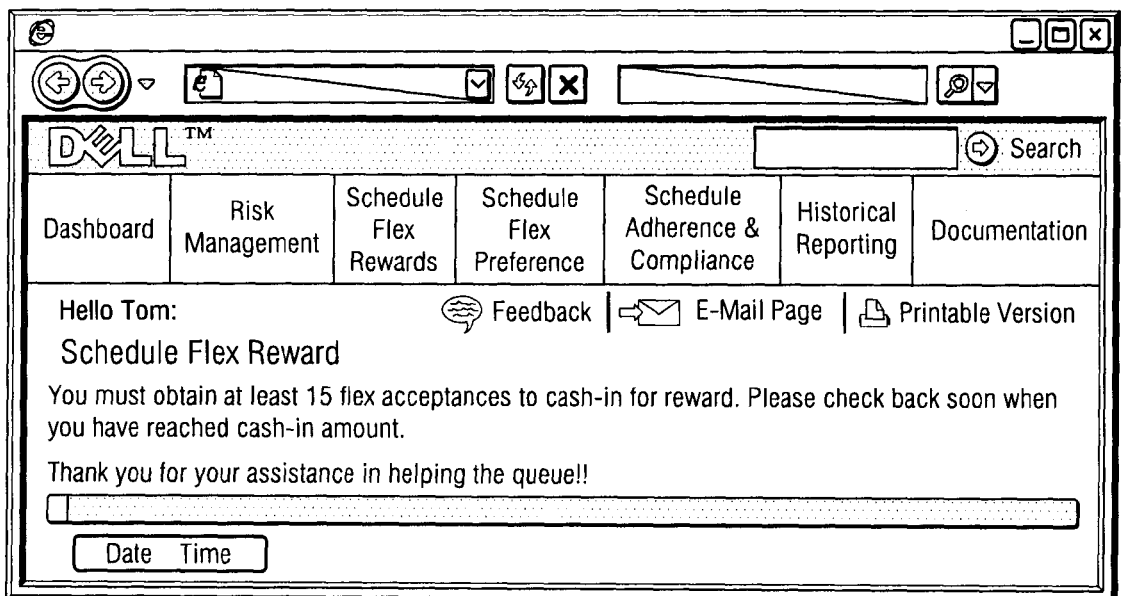
FIG. 1g illustrates an embodiment of a CCM flex rewards web page used in the system of FIG. 1b.

Referring now to FIG. 1g, an embodiment of a CCM flex rewards web page 180 is illustrated. The CCM flex rewards web page 180 may be provided to the agent 132 by the web server of the CCM 124 in order to provide information about progress towards a flex reward for the agent 132. In an embodiment, after the agent 132 is eligible to receive a reward, the CCM flex rewards web page 180 may allow the agent 132 to choose an award such as, for example, an extra scheduled break.

Figure 1H:
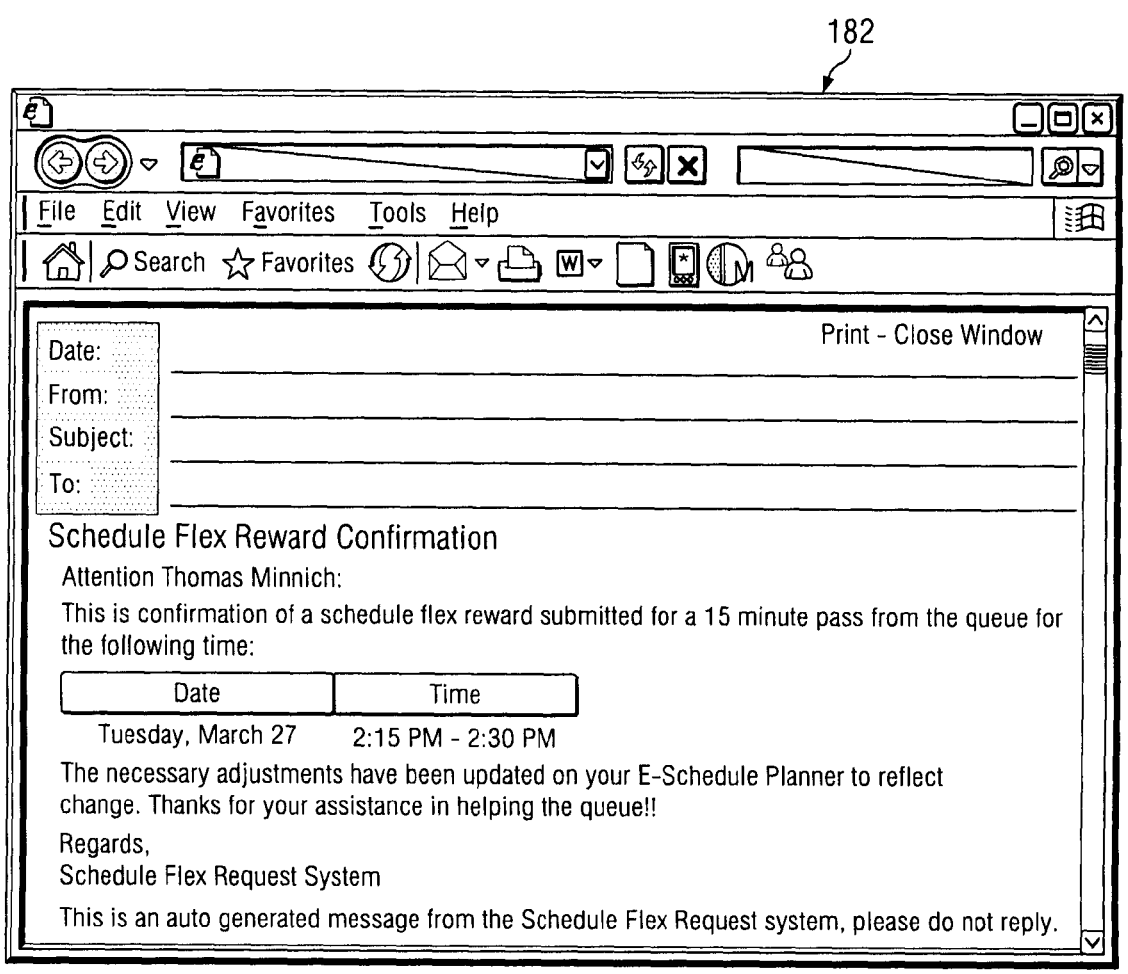
FIG. 1h illustrates an embodiment of a flex reward confirmation e-mail used in the system of FIG. 1b.

Referring now to FIG. 1h, in an embodiment, the agent 132 may then receive a flex reward confirmation e-mail 182 from the CCM 124 confirming the extra scheduled break.

Referring now to FIG. 1i, an embodiment of a CCM flex reporting web page 190 is illustrated. The CCM flex reporting web page 190 may be provided to the manager 136 by the CCM 124 to provide flex status reports about each of the agents (e.g., agents 132 and 134), including a total number of flex requests, a total number of accepted flex requests, a total number of declined flex requests, and a flex request acceptance percentage. In an embodiment, the manager 136 may filter the status report results by date range, location, and/or manager (e.g., the manager 136).

Referring now to FIGS. 2a and 2b, an embodiment of a method 200 to manage a call center is illustrated. The method 200 begins at block 202 where the CCM 124 selects a time interval to analyze. In an embodiment, the CCM 124 may select the time interval immediately after the current time interval. In an alternative embodiment, the CCM 124 may select any other time interval in the future. The method 200 then proceeds to block 204 where the CCM 124 calculates the expected capability and the expected call completion, described above, for the selected time interval.

The method 200 then proceeds to decision block 206 where the CCM 124 determines whether the expected capability for the selected time interval is higher than the expected call completion for the selected time interval. If at decision block 206 the CCM 124 determines that the expected capability for the selected time interval is higher than the expected call completion for the selected time interval, the method 200 returns to block 202 where the CCM 124 selects a time interval to analyze.

If at decision block 206 the CCM 124 determines that the expected capability for the selected time interval is not higher than the expected call completion, the method proceeds to decision block 208 where the CCM 124 determines whether there is a subsequent time interval where the expected capability of the subsequent time interval is higher than the expected call completion of the subsequent time interval. If at decision block 208 the CCM 124 determines that there is not a subsequent time interval where the expected capability of the subsequent time interval is higher than the expected call completion of the subsequent time interval, the method 200 returns to block 202 where the CCM 124 selects a time interval to analyze.

If at decision block 208 the CCM 124 determines that there is a subsequent time interval where the expected capability of the subsequent time interval is higher than the expected call completion of the subsequent time interval, the method proceeds to decision block 210 where the CCM 124 determines whether there is an agent (e.g., agent 132) that can flex a scheduled inbound phone queue state from the subsequent time interval to the selected time interval. In an embodiment, in order for the agent 132 to be able flex from the subsequent time interval to the selected time interval, the CCM 124 may verify that the agent 132 has a scheduled auxiliary phone state during the selected time interval and a scheduled inbound phone queue state during the subsequent time interval, for example, so that the states can be swapped and/or shuffled in the schedule in order to attempt to increase the expected capability for the selected time interval. In an embodiment, as part of the determination, the CCM 124 may analyze flex preferences of the agent 132, described above with reference to FIG. 1e. In an embodiment, as part of the determination, the CCM 124 may verify that flexing the state of the agent 132 from the subsequent time interval to the selected time interval would not cause the expected capability of the subsequent time interval to drop below the expected call completion of the subsequent time interval. In an embodiment, the CCM 124 may use more complex rules that involve a variety of time intervals and/or agents in order to attempt to increase the expected capability for the selected time interval. If at decision block 210 the CCM 124 determines that there is not an agent that can flex from the subsequent time interval to the selected time interval, the method 200 returns to block 202 where the CCM 124 selects a time interval to analyze.

If at decision block 210 the CCM 124 determines that there is an agent (i.e., agent 132) that can flex from the subsequent time interval to the selected time interval, the method 200 proceeds to block 212 where the CCM 124 sends an e-mail to the agent 132 with a flex request. In an embodiment, the e-mail may include the flex request e-mail 170, described above with reference to FIG. 1f. In an embodiment, the e-mail may include a link to a web page where the agent 132 may respond to the flex request. In another embodiment, other communication methods may be used to send the flex request to the agent 132 such as, for example, an instant message, a phone message, or a pager message.

The method 200 then proceeds to decision block 214 where the CCM 124 determines whether the agent 132 responds to the flex request within a certain time period. In an embodiment, the time period may be 10 minutes. If at decision block 214 the CCM 124 determines that the agent 132 does not respond to the flex request within a certain time period, the CCM 124 assumes a negative response and the method 200 proceeds to block 216 where the CCM 124 stores a negative response to the flex request on behalf of the agent 132. In an embodiment, the negative response may be stored in a database. The method then returns to block 202 where the CCM 124 selects a time interval to analyze.

If at decision block 214 the CCM 124 determines that the agent 132 does respond to the flex request within a certain time period, the method 200 proceeds to decision block 218 where the CCM 124 determines whether the response from the agent 132 is positive (i.e., whether the agent accepted the flex request). If at decision block 218 the CCM 124 determines that the response from the agent 132 is not positive, the method proceeds to block 214, where the CCM 124 stores a negative response to the flex request on behalf of the agent 132, as described above.

If at decision block 218 the CCM 124 determines that the response from the agent 132 is positive, the method 200 proceeds to block 220 where the CCM 124 stores a positive response to the flex request on behalf of the agent 132. In an embodiment, the positive response may be stored in a database. The method then proceeds to block 222 where the CCM 124 updates the schedule for the agent 132, the expected capability for the selected time interval, and the expected capability for the subsequent time interval in order to reflect the accepted flex request. In an embodiment, the CCM 124 may further provide a flex reward to the agent 132, as described above. The method 200 then ends at block 224.

Figures 3A, 3B:
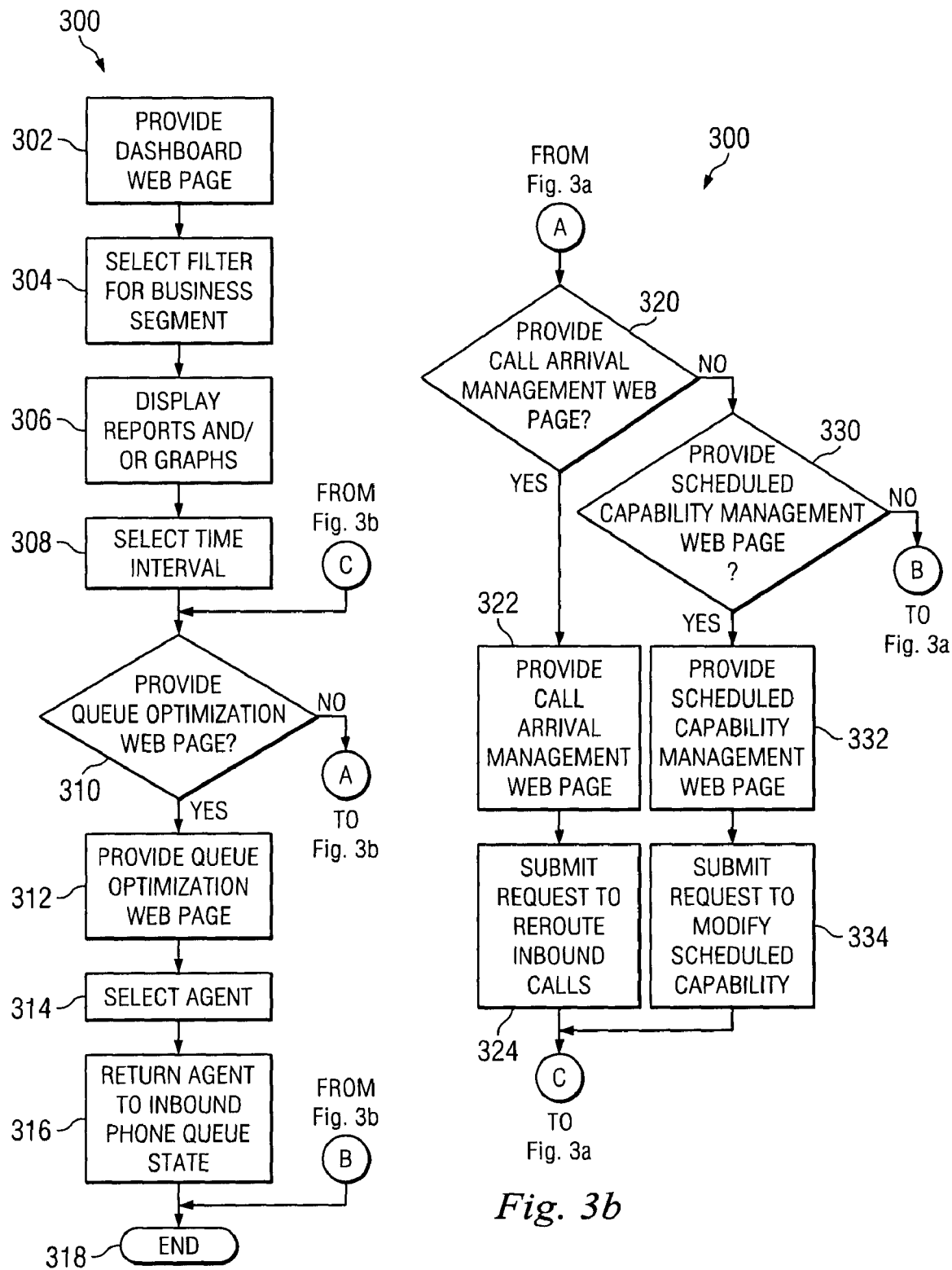
FIGS. 3a and 3b illustrate an embodiment of a second method to manage a call center using the system of FIG. 1b.

Referring now to FIG. 3a, an embodiment of another method 300 to manage a call center is illustrated. The method 300 begins at block 302 where the CCM 124 provides the CCM dashboard web page 140, described above with reference to FIG. 1c, to the manager 136. The CCM dashboard web page 140 may be provided over the network 122 to the manager IHS 130. In an embodiment, the manager 136 may login prior to accessing the CCM dashboard web page 140. In an alternative embodiment, another web page may be provided to the manager 136 instead of or in addition to the CCM dashboard web page 140.

The method 300 then proceeds to block 304 where the manager 136 selects a filter for a business segment on the CCM dashboard web page 140. In an embodiment, the manager 136 may select a filter from the business filter section 142 of the CCM dashboard web page 140.

The method 300 then proceeds to block 306 where the CCM dashboard web page 140 displays reports and/or graphs that reflect the selected business segment. In an embodiment, the reports and/or graphs may include at least one of the queue tracker section 144 and the queue summary/capability section 146. In an embodiment, the reports and/or graphs may display a red flag indicator adjacent to each time interval for which expected capability is not higher than expected call completion. In an embodiment, the manager 136 may watch the CCM dashboard web page 140 in order to monitor performance of the call center.

The method 300 then proceeds to block 308 where a time interval is selected. In an embodiment, the selected time interval may default to the present time interval. In an embodiment, the manager 136 may be allowed to select the time interval by clicking on a bar in the queue tracker section 144 of the CCM dashboard web page 140.

The method 300 then proceeds to block 310 where the CCM 124 determines whether a queue optimization web page should be provided to the manager 136. In an embodiment, the CCM 124 may make the determination by detecting whether the manager 136 clicks a corresponding link on the CCM dashboard web page 140.

Figure 3C:
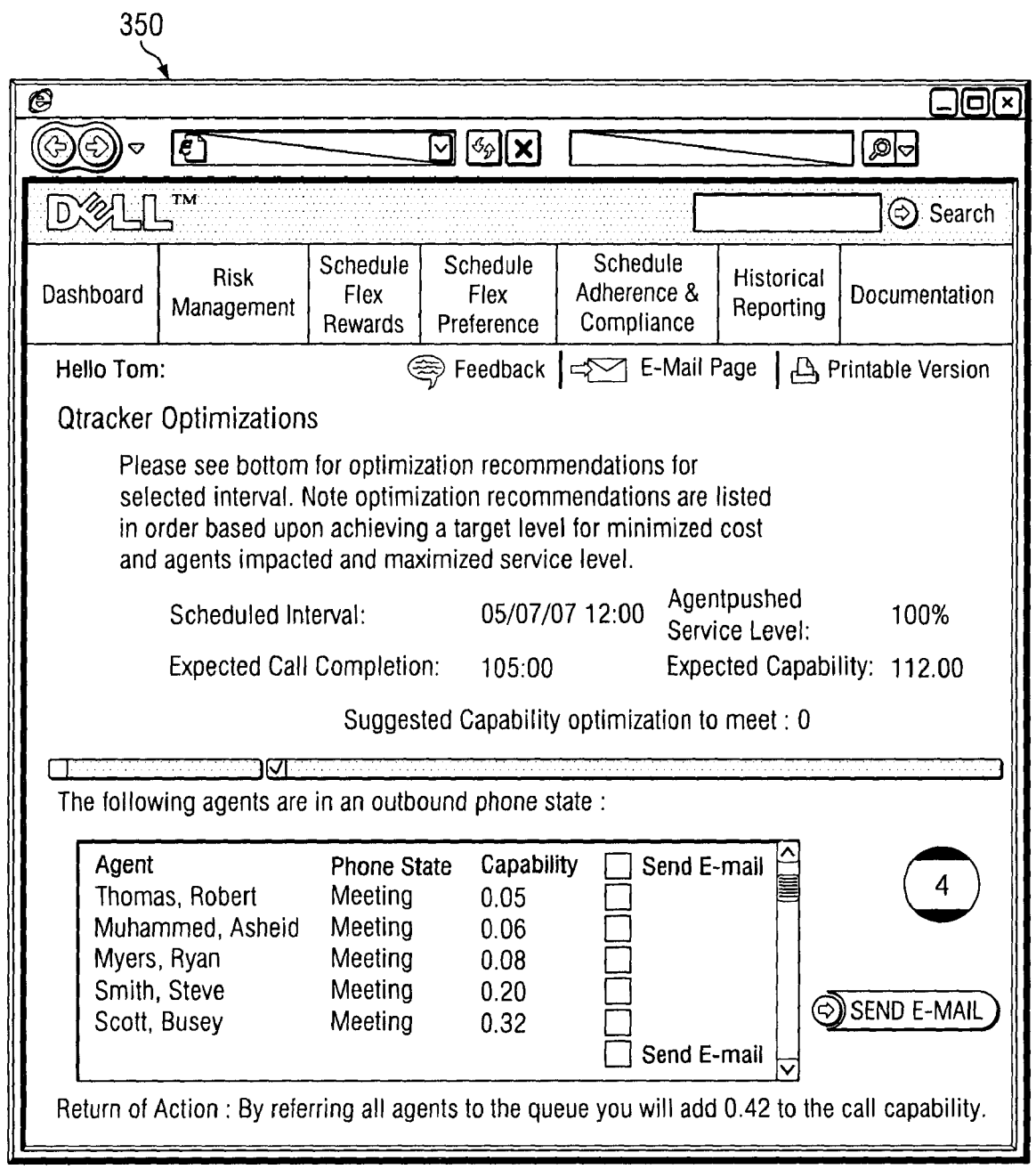
FIG. 3c illustrates an embodiment of a CCM queue optimization web page used in the method of FIGS. 3a and 3b.

If at decision block 310 the CCM 124 determines that a queue optimization web page should be provided to the manager 136, the method 300 proceeds to block 312 where a queue optimization web page is provided to the manager 136. The queue optimization web page may include various recommendations by the CCM 124 to improve the expected capability for the selected time interval. In an embodiment, the queue optimization web page may display information about agents (e.g., the agents 132 and/or 134) that are in an unplanned auxiliary phone state, described above. In an embodiment, the queue optimization web page may display information about agents that are in an outbound phone state, but that are not presently on an outbound call. In an embodiment, the queue optimization web page may further display an impact on the expected capability for the selected time interval given that selected agents will be returned to the inbound phone queue. In an embodiment, the queue optimization web page may include a CCM queue optimization web page 350, illustrated in FIG. 3c.

In an embodiment, if one or more of the agents are in an unplanned auxiliary phone state, or if one of more of the agents are in an outbound phone state but are not presently on an outbound call, the CCM 124 may update this information into scheduling data in order to improve future calculations for variance in expected capability.

Figure 3D:
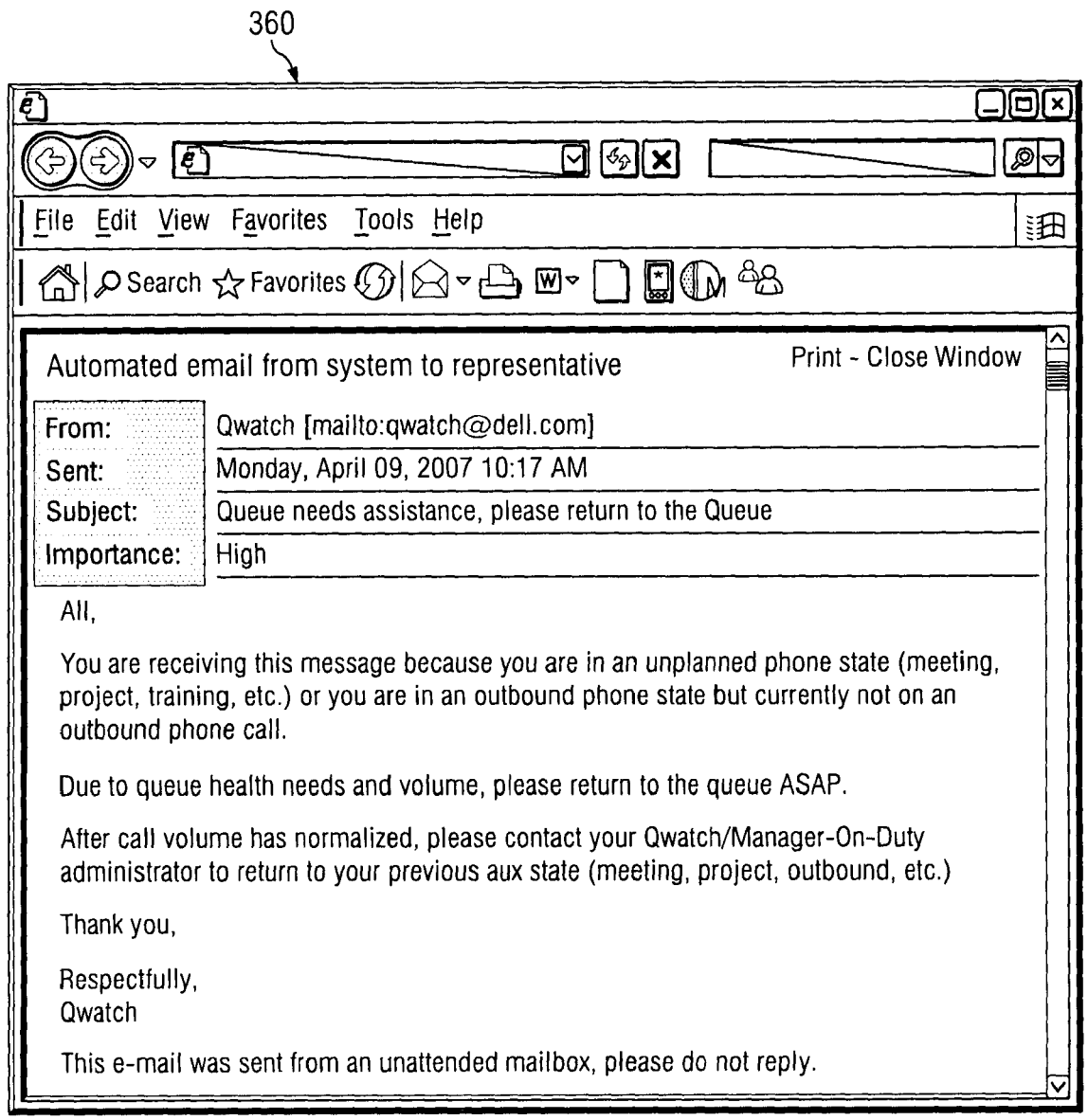
FIG. 3d illustrates an embodiment of a staffing optimization e-mail used in the method of FIGS. 3a and 3b.

The method 300 then proceeds to block 314 where the manager 136 selects the agent 132 from the queue optimization web page in order to request that the agent 132 changes to an inbound phone queue state. In an embodiment, the manager 136 may select the agent 132 from the CCM queue optimization web page 350, and the CCM 124 may then send an e-mail to the agent 132 requesting that the agent 132 change to an inbound phone queue state in order to improve the expected capability for the selected time interval. In an embodiment, the e-mail may include a staffing optimization e-mail 360, illustrated in FIG. 3d.

The method 300 then proceeds to block 316 where the agent 132 returns to the inbound phone queue (i.e., changes to an inbound phone queue state). The expected capability may then be increased by the average capability of the agent 132, and reports and/or graphs provided by the CCM 124 may be updated accordingly. The method 300 then ends at block 318.

If at decision block 310 the CCM 124 determines that a queue optimization web page should not be provided to the manager 136, the method 300 proceeds to decision block 320 where the CCM 124 determines whether a call arrival management web page should be provided to the manager 136. In an embodiment, the CCM 124 may make the determination by detecting whether the manager 136 clicks a corresponding link on the CCM dashboard web page 140.

If at decision block 320 the CCM 124 determines that a call arrival management web page should be provided to the manager 136, the method 300 proceeds to block 322 where a call arrival management web page is provided to the manager 136. In an embodiment, the call arrival management web page may include a CCM risk management web page 370, illustrated in FIG. 3e. The call arrival management web page may allow the manager 136 to reroute inbound calls from a source inbound phone queue to a destination inbound phone queue. The manager 136 may desire to reroute the inbound calls for a variety of reasons such as, for example, tool outages, network outages, infrastructure outages, or inclement weather. In an embodiment, the destination inbound phone queue may be located at a different call center and/or location than the source inbound phone queue.

The method 300 then proceeds to block 324 where the manager 136 uses the call arrival management web page to submit a request to reroute inbound calls. In an embodiment, the manager may enter a reason, one or more time intervals, a source inbound phone queue, a destination inbound phone queue, comments, and/or an impact modifier. The impact modifier may include a percentage of calls to route from the source inbound phone queue to the destination phone queue.

The method 300 then proceeds to block 326 where the CCM 124 provides a list of agents that may be changed to an inbound phone queue state in order to improve expected capability for time intervals that will be affected by the request to reroute inbound calls. In an embodiment, the list of agents may include agents that may be able to flex from subsequent time intervals to the affected time intervals, similar to as described above. In an embodiment, the CCM 124 may further display an impact on the expected capability for the affected time intervals given that the agents will be changed to an inbound phone queue state. The method 300 then returns to decision block 310 where the CCM 124 determines whether a queue optimization web page should be provided to the manager 136.

If at decision block 320 the CCM 124 determines that a call arrival management web page should not be provided to the manager 136, the method 300 proceeds to decision block 330 where the CCM 124 determines whether a scheduled capability management web page should be provided to the manager 136. In an embodiment, the CCM 124 may make the determination by detecting whether the manager 136 clicks a corresponding link on the CCM dashboard web page 140.

If at decision block 330 the CCM 125 determines that a scheduled capability management web page should be provided to the manager 136, the method 300 proceeds to block 332 where a scheduled capability management web page is provided to the manager 136. The scheduled capability management web page may allow the manager 136 to modify the scheduled capability, described above, for the selected time interval. The manager 136 may desire to modify the scheduled capability for a variety of reasons such as, for example, tool, network, or infrastructure outages which may affect the capability of the agents 132 and/or 134.

The method 300 then proceeds to block 334 where the manager 136 uses the scheduled capability management web page to submit a request to modify the scheduled capability. In an embodiment, the manager may enter a reason, one or more time intervals, affected agents, comments, and/or an impact modifier. The impact modifier may include a percentage of scheduled capability that is affected. The method 300 then returns to decision block 310 where the CCM 124 determines whether a queue optimization web page should be provided to the manager 136.

If at decision block 330 the CCM 125 determines that a scheduled capability management web page should not be provided to the manager 136, the method 300 ends at block 318.

Thus, embodiments are provided for improved call center queue management. Expected capabilities and expected call completions are determined for time intervals. Each of the expected capabilities and the expected call completions may be adjusted in order to meet customer service levels and save costs.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method comprising:
obtaining call completion data for each agent of a plurality of agents, wherein the obtaining is performed by an information handling system (IHS);
calculating a historical average for each agent using the call completion data, wherein the historical average calculating is performed by the IHS; and
calculating an average capability of each agent using the historical average, wherein the average capability calculating is performed by the IHS;
determining an expected variance, wherein the expected variance includes a historical average of agent schedule non-compliance during a similar time interval, wherein the determining is performed by the IHS;
using the expected variance to determine an expected capability of the plurality of agents, wherein the expected variance using is performed by the IHS;
tracking schedule compliance, wherein the tracking is performed by the INS;
obtaining schedule compliance information, wherein the obtaining is performed by the IHS; and
using the schedule compliance information to determine the historical average of agent schedule non-compliance, wherein the schedule compliance using is performed by the IHS.

2. The method of claim 1, further comprising:
monitoring the call completion data for each agent, wherein the monitoring is performed by the IHS.

3. The method of claim 1, wherein the average capability of each agent includes a capability of each agent to complete a certain number of calls during a specified time interval.

4. The method of claim 1, further comprising:
using the average capability of each agent to determine a planned capability of the plurality of agents, wherein the using is performed by the IHS, and wherein the planned capability includes a sum of the average capability of each agent assuming that each agent is working at full capacity.

5. The method of claim 4, further comprising:
using the planned capability to determine an expected capability of the plurality of agents, wherein the planned capability using is performed by the IHS.

6. The method of claim 1, further comprising:
creating a schedule for the plurality of agents, wherein the creating is performed by the IHS.

7. The method of claim 1, further comprising:
monitoring a utilized capability for each agent, wherein the monitoring is performed by the IHS; and
using the utilized capability of each agent to determine an actual capability for each agent, wherein the utilized capability using is performed by the IHS.

8. The method of claim 7, further comprising:
storing the actual capability of each agent, wherein the storing is performed by the IHS.

* * * * *

UNITED STATES PATENT AND TRADEMARK OFFICE
CERTIFICATE OF CORRECTION

| | | |
|---|---|---|
| PATENT NO. | : 8,150,022 B2 | Page 1 of 1 |
| APPLICATION NO. | : 11/959608 | |
| DATED | : April 3, 2012 | |
| INVENTOR(S) | : Thomas M. Minnich, Jr. and Ted Alan Wrenn, Jr. | |

It is certified that error appears in the above-identified patent and that said Letters Patent is hereby corrected as shown below:

Column 11, line 20, "INS" should be --IHS--

Signed and Sealed this
Thirty-first Day of July, 2012

David J. Kappos
*Director of the United States Patent and Trademark Office*